US006975622B2

(12) United States Patent
Korycki et al.

(10) Patent No.: US 6,975,622 B2
(45) Date of Patent: Dec. 13, 2005

(54) ENHANCED PHONE-BASED COLLABORATION

(75) Inventors: Jacek Korycki, Monmouth Junction, NJ (US); Robert Peszek, Piscataway, NJ (US); Darek Smyk, Piscataway, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 9 days.

(21) Appl. No.: 10/756,526

(22) Filed: Jan. 13, 2004

(65) Prior Publication Data
US 2005/0008000 A1 Jan. 13, 2005

Related U.S. Application Data

(60) Provisional application No. 60/485,880, filed on Jul. 8, 2003.

(51) Int. Cl.[7] .............................................. H04L 12/66
(52) U.S. Cl. ...................... 370/352; 370/260; 709/204
(58) Field of Search ............................. 370/352, 353, 370/354, 356, 392, 400, 401, 259, 260, 261, 370/493, 494, 495; 379/157, 158, 202.01, 379/221.08, 221.09, 221.1, 221.15; 709/204, 709/205, 227, 228

(56) References Cited

U.S. PATENT DOCUMENTS

| | | | |
|---|---|---|---|
| 6,493,444 B2 * | 12/2002 | Williams ............... | 379/221.08 |
| 6,690,654 B2 * | 2/2004 | Elliott et al. ............... | 370/260 |
| 6,728,756 B1 * | 4/2004 | Ohkado ...................... | 709/205 |
| 2001/0056466 A1 * | 12/2001 | Thompson et al. ......... | 709/204 |
| 2002/0129106 A1 * | 9/2002 | Gutfreund ................... | 709/205 |
| 2002/0136167 A1 * | 9/2002 | Steele et al. ................ | 370/260 |
| 2002/0138624 A1 * | 9/2002 | Esenther ..................... | 709/227 |
| 2002/0156671 A1 * | 10/2002 | Libra et al. .................... | 705/9 |
| 2003/0041108 A1 * | 2/2003 | Henrick et al. ............. | 709/205 |
| 2003/0055893 A1 * | 3/2003 | Sato et al. .................. | 709/204 |
| 2004/0049539 A1 * | 3/2004 | Reynolds et al. ........... | 709/203 |
| 2004/0153504 A1 * | 8/2004 | Hutchinson et al. ........ | 709/204 |
| 2004/0249884 A1 * | 12/2004 | Caspi et al. ................ | 709/204 |

* cited by examiner

Primary Examiner—Phirin Sam
(74) Attorney, Agent, or Firm—Joseph Giordano; James W. Falk

(57) ABSTRACT

The present invention relates to a system and method for enhanced phone-based collaboration (EPC), which enables users to quickly and easily enhance an ongoing phone call with a variety of interpersonal real-time two-way communications (IRTC).

9 Claims, 9 Drawing Sheets

ENHANCED PHONE-BASED COLLABORATION

CROSS-REFERENCE TO RELATED APPLICATIONS

This application claims the benefit of U.S. Provisional Application No. 60/485,880, filed Jul. 8, 2003, the contents of which are hereby incorporated by reference.

FIELD OF THE INVENTION

The present invention relates generally to a system and method for enhanced phone-based collaboration, which allows users to more easily and securely collaborate using a variety of inter-personal real-time two-way communications media.

BACKGROUND

Remote inter-personal real-time two-way communication (IRTC) became possible with the invention of the telephone over 100 years ago. Since then, due to technological progress, other forms of IRTC became possible. Currently, the most popular forms of IRTC include wireline and wireless telephony, audio/video conferencing, instant messaging, application sharing, desktop display sharing, whiteboard sharing, networked gaming and co-browsing. While different forms of the IRTC penetrated different markets, it is fair to say that generally telephony is pervasive in most business and personal activities while all the other forms of IRTC have a significantly smaller market penetration than telephony.

While telephony is currently the most ubiquitous and easy to use form of IRTC, end users would benefit by being able to augment a telephone conversation with other forms of IRTC. For example, during a phone conversation with a manager, a sales rep may want to jointly review and modify slides which will be presented at an upcoming client meeting. In another example, while a residential PC user talks to a software troubleshooting service representative, the user may want to add desktop sharing to the phone call in progress. In yet another example, two friends may want to jointly step through their vacation pictures while talking on the phone about recent vacations.

In all of these scenarios, communicating parties start with a simple phone call and then, as appropriate, add other forms of IRTC. As noted, currently the most common form of inter-personal real-time two-way communication is a wireline/wireless phone conversation where telephone parties use one of the following devices: a POTS phone, a PBX/CENTREX phone or a mobile phone. Other forms of IRTC, such as video conferencing, instant messaging, PC-based application sharing, desktop display sharing, whiteboard sharing, networked gaming and co-browsing, are becoming increasingly popular, but require the use of appropriate end-user devices, e.g. networked PCs, PDA's, notepads or advanced mobile phones.

One problem is that most IRTC interactions start with a regular phone call and there is no easy way to add other forms of IRTC to the phone call in progress. For example, in the scenario where a sales rep calls a manager to chat about an upcoming customer meeting and during the conversation the two decide to jointly review/update presentation slides, both of the parties must have access to networked PCs in order to collaborate on the presentation. However, in a typical environment it is not easy to establish joint editing of slides. Rather, this type of collaboration is generally done completely independently from the phone call in progress. The two collaboration participants must agree on using the same collaboration application, and then establish the collaboration session, typically using a completely separate addressing schema and collaboration session establishment signaling. The complexity associated with this operation is enough to discourage all but the most technically inclined end users.

In another example, similar difficulties arise when two friends while talking on the phone about their recent vacations would like to jointly view sets of vacation pictures. In a still further example, a house seller and real estate attorney lawyer having a phone conversation about the results of a home inspection decide to jointly prepare a response to the buyer's long list of repair requests. As with the above examples, there is no easy way to add collaborative document viewing and editing.

In particular, upon user A and user B agreeing to enhance the phone call, they must also agree on which software product will be used to enhance the phone call. This decision may require a technical savvy of network, firewall/NAT infrastructure that affects many of the existing software products. Some of the known choices include T.120 clients such as NetMeeting, IM products such as Yahoo! Windows Messenger, etc., and existing web conferencing solutions such as DCL Meeting Server, WebEx, etc.

To utilize these software products, users must have access to the software, which may require purchasing the software, software installation and establishing a billing agreement between the users and the service provider. Then the collaboration session must be established. This is accomplished by setting up the enhanced session manually using tools provided by the corresponding product, exchanging the information required to connect to the session and manually entering the information in the corresponding application. Such information may include IP addresses (NetMeeting or other T.120 clients), subscription IDs (IM products), and Conference Server URL with tokens such as conference key, and password (web conferencing solutions).

Exchanging the information necessary for entering the collaboration may further entail the web conference providers sending the information by e-mail distribution. While this procedure is viable for conferences scheduled in advance, this approach lacks real time characteristics required for ad-hoc spontaneous call enhancement.

Many of the current methods of enhancing the phone call are cumbersome and are not practical unless both users already subscribe to the same service and have already installed the corresponding software. Even if software installation and service subscription are not issues, the collaboration setup process involves many manual steps that diminish both usefulness and accessibility.

The manual process requires, at minimum, the users to perform session signaling twice: first using phones and phone numbers, then using PC based collaboration application and it's proprietary session signaling and addressing. However simple the application signaling is, it requires effort and needs to be learned by the users.

Therefore, there remains a need in the art for improvements in the technology of enhanced phone-based collaboration.

SUMMARY

The present invention describes the solution to enable the above types of scenarios, as well as others. The present invention provides end users with an easy and convenient way to augment phone conversions with other forms of communication and collaboration. Further, the present invention provides telephone service providers with an opportunity to expand their offering of value added services.

The present invention provides a system and method for Enhanced Phone-based Collaboration (EPC) service that will enable telephone parties to easily and conveniently add other IRTC applications for collaboration by leveraging the phone call already in progress. In particular, in accordance with the present invention, to start the collaboration, the telephone parties would only need to identify the phone call in progress, which they want to enhance. The present invention will be more fully described below with reference to the Drawing Figures.

BRIEF DESCRIPTION OF THE DRAWINGS

FIG. 1

DETAILED DESCRIPTION OF THE DRAWINGS

Figure 1:
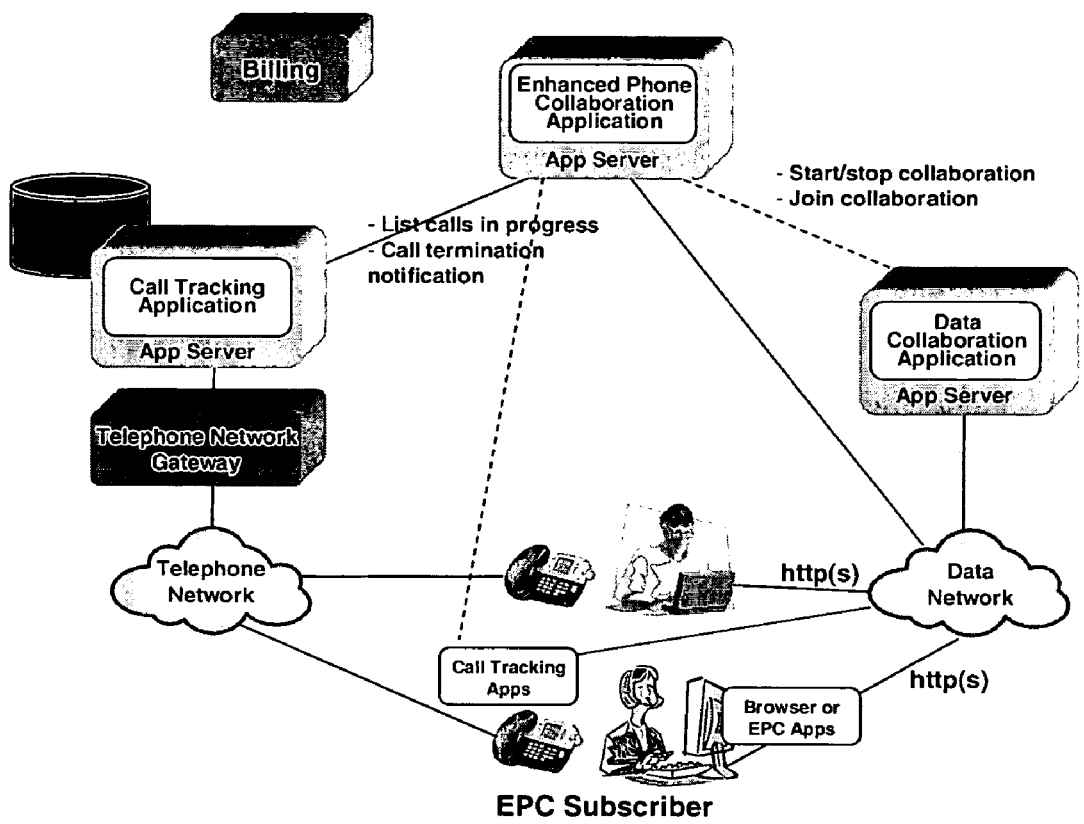
FIG. 1 depicts high-level implementation architecture for EPC in accordance with one embodiment of the present invention.

The EPC service according to the present invention enables users, which participate in a phone call; to enrich their communication with a variety of PC based applications. The EPC service of the present invention bridges existing technologies to provide a simple and straightforward experience to the users, which overcomes the disadvantages, noted above with respect to known methods and services.

The method and system of the present invention provides a much simpler and more spontaneous means for establishing collaboration. In particular, a subscriber needs only to establish a phone call and the enhancement can be achieved by using a choice driven web page. The users do not need to learn the application specific signaling, nor do they need to enter any application specific remote address. Even if there is only one subscriber on the call, the process is simplified.

The non-subscriber simply needs to enter his own phone number. There is no need for the non-subscriber to learn application specific signaling.

In addition, the EPC service of the present invention provides a benefit to service providers, application developers, and end customers. For example, the EPC service of the present invention defines an open architecture allowing third party integration of an arbitrary form of IRTC (such as a third party network game) with a phone call. This gives motivation for application development of new forms of IRTC and may open new revenue streams for the service provider. The EPC services of the present invention allow service providers to offer a variety of user-friendly phone call enhancements accessible to a broad customer base by utilization of both a large customer base and common billing structure. Application developers are attracted by a large customer base willing to use their services and common billing infrastructure, which simplifies the complexity of applications and reduces development cost. Customers can enjoy a user-friendly interface, a variety of new forms of IRTC, and convenience of maintaining only one account with one password to remember and a single bill from a single Service Provider.

The present invention will be described in detail with reference to the drawing figures. Initially, it is noted that while the description and drawings show implementation scenarios for PC-based collaboration, that the present invention applies equally to other interactive networked devices, such as PDAs, notepads, advanced mobile phones, etc. Further, for simplicity, the description and drawings show implementation in the context of a two party call, but the present invention applies equally to enhancement of multi-party or conference calls.

The present invention provides a system and method for EPC service that will enable telephone parties to easily and conveniently add other IRTC applications for collaboration by leveraging the phone call which is already in progress. In particular, in accordance with the present invention, to start the collaboration, the telephone parties would only need to identify the phone call in progress, which they want to enhance. However, the user experience will vary depending on whether the user subscribes to an EPC service. Therefore, the present invention is described below for both scenarios in which there is only one subscriber and in which both parties are subscribers. Further, several different implementation schemes will be described for both scenarios.

In a first scenario, both parties subscribe to the EPC service and implementation of the EPC service can be carried out via a browser with full telephony integration; via a browser with limited telephony integration; via an application with full telephony integration; or via an application with limited telephony integration.

For example, in a browser-based implementation with full telephony integration, either subscriber may use their favorite browser to access an EPC service site. After successfully authenticating the initiating subscriber, the browser displays the list of that subscriber's phone calls in progress. The initiating subscriber clicks on a particular call on the list in order to add enhanced collaboration to that call. Optionally, the collaboration automatically terminates when the associated phone call is terminated.

In a further example, using a browser-based implementation with limited telephony integration, either subscriber may use their favorite browser to access an EPC service site. After being successfully authenticated by the service provider, the initiating subscriber enters the other parties' telephone number and clicks on a "start to collaborate"

button. It is important to note that for this scenario and implementation, either subscriber can initiate the collaboration.

Moreover, in an application-based implementation with full telephony integration, either subscriber may start the EPC application. After successfully authenticating the initiating subscriber, the application displays the list of that subscriber's phone calls in progress. The initiating subscriber clicks on a particular call on the list in order to add enhanced collaboration to that call. Optionally, the collaboration automatically terminates when the associated phone call is terminated. It is important to note that for this scenario and implementation, either subscriber can initiate the collaboration.

In another example, for an application-based implementation with limited telephony integration, either subscriber may start the EPC application. After being successfully authenticated by the service provider, the initiating subscriber enters the other parties' phone number and clicks on a "start to collaborate" button. It is important to note that for this scenario and implementation, either subscriber can initiate the collaboration.

In a second scenario, only one party subscribe to the EPC service, however, implementation of the EPC service can be carried out in any one of the implementations noted above; i.e. via a browser with full telephony integration; via a browser with limited telephony integration; via an application with full telephony integration; or via an application with limited telephony integration.

For example, in a browser-based implementation with full telephony integration, the subscriber may use a favorite browser to access an EPC service site. After successfully authenticating the subscriber, the browser displays the list of the subscriber's phone calls in progress. The subscriber clicks on a particular call on the list in order to add enhanced collaboration to that call. Optionally, the collaboration automatically terminates when the associated phone call is terminated.

In a further example, for a browser-based implementation with limited telephony integration, the subscriber may use a favorite browser to access an EPC service site. After being successfully authenticated by the service provider, the subscriber enters the other parties' telephone number and clicks on a "start to collaborate" button.

In an additional example, for an application-based implementation with full telephony integration, the subscriber may start the EPC application. After successfully authenticating the subscriber, the application displays the list of the subscriber's phone calls in progress. The subscriber clicks on a particular call on the list in order to add enhanced collaboration to that call. Optionally, the collaboration automatically terminates when the associated phone call is terminated.

Moreover, for an application-based implementation with limited telephony integration, the subscriber may start the EPC application. After being successfully authenticated by the service provider, the subscriber enters the other parties' phone number and clicks on a "start to collaborate" button.

As noted above, if both parties are subscribers, either party may initiate the collaboration. However, a non-subscriber will be able to collaborate only upon an explicit invitation by the EPC subscriber. In particular, during the phone conversation the EPC subscriber will invite the non-subscriber to collaborate and provide instructions on how to the non-subscriber can join collaboration session using an off-the-shelf Internet browser. For example, the EPC subscriber will provide the non-subscriber with a guest page URL over the phone, or by an e-mail message, etc. (such as www.serviceprovider.com/epcguest). To start collaboration the subscriber simply enters both parties' phone numbers and clicks on a "start to collaborate" button.

FIG. 1 depicts high-level implementation architecture for EPC in accordance with one embodiment of the present invention. In particular, the architecture in FIG. 1 comprises the following components.

Telephone Network—This network may be circuit switch based (e.g. AIN PSTN network) or packet based (e.g. IP network with SIP or H.248 based phones). The network may be the Public Telephone Network or a private enterprise network.

Call Tracking Application—This application keeps track of the EPC subscriber's telephone calls in progress and may be network server based or CPE-based. For example, the server based Call Tracking Application could track calls in the PSTN via a Parlay-based PSTN Gateway or for wireless phone based application could track calls originating/terminating from/on the given wireless phone device. The Call Tracking Application supports an interface for external application, such as the EPC application, to retrieve calls in progress and optionally receive notifications about call termination.

Telephone Network Gateway—The gateway provides the Call Tracking Application with information necessary to perform call tracking. For example, a Parlay-based Telephone Network Gateway would provide the Call Tracking Application with notifications about establishment/termination of telephone calls.

Data Network—This is a packet-based network, e.g. IP network. Therefore, in the case of packet-based telephony the Telephone Network and Data Network can be the same IP based network.

Data Collaboration Application—This application supports real-time data collaboration, (e.g. video conferencing, instant messaging, PC-based application sharing, desktop display sharing, whiteboard sharing, networked gaming and co-browsing). This application could be server and/or CPE (e.g. PC, notepad, PDA) based. For example, the Data Collaboration Application could be server based and utilize T.120 protocols to support application sharing, in which case, the user device based portion of the Data Collaboration Application may include only an Internet browser executing a data collaboration applet, downloadable on demand.

Enhanced Phone-based Collaboration Application—This application supports a seamless transition from a simple phone call to a phone call extended with data collaboration. When the EPC subscriber invokes the EPC Application, the application first obtains the list of calls in progress from Call Tracking Application and presents the subscriber with a list of calls suitable for enhancement with data collaboration. After the EPC subscriber chooses the call for enhancement, the EPC signals to the Data Collaboration Application to establish the data collaboration session. In the case, where the Call Tracking Application is not capable of providing the full information about the calls in progress (e.g. due to the blocked caller ID), the EPC Application provides the EPC subscriber with the means to manually enter the information about the call to be enhanced. After the Data Collaboration Application establishes the data collaboration session for the EPC subscriber, it provides the other telephone party(s) with the means to join the data collaboration session.

Figure 2:
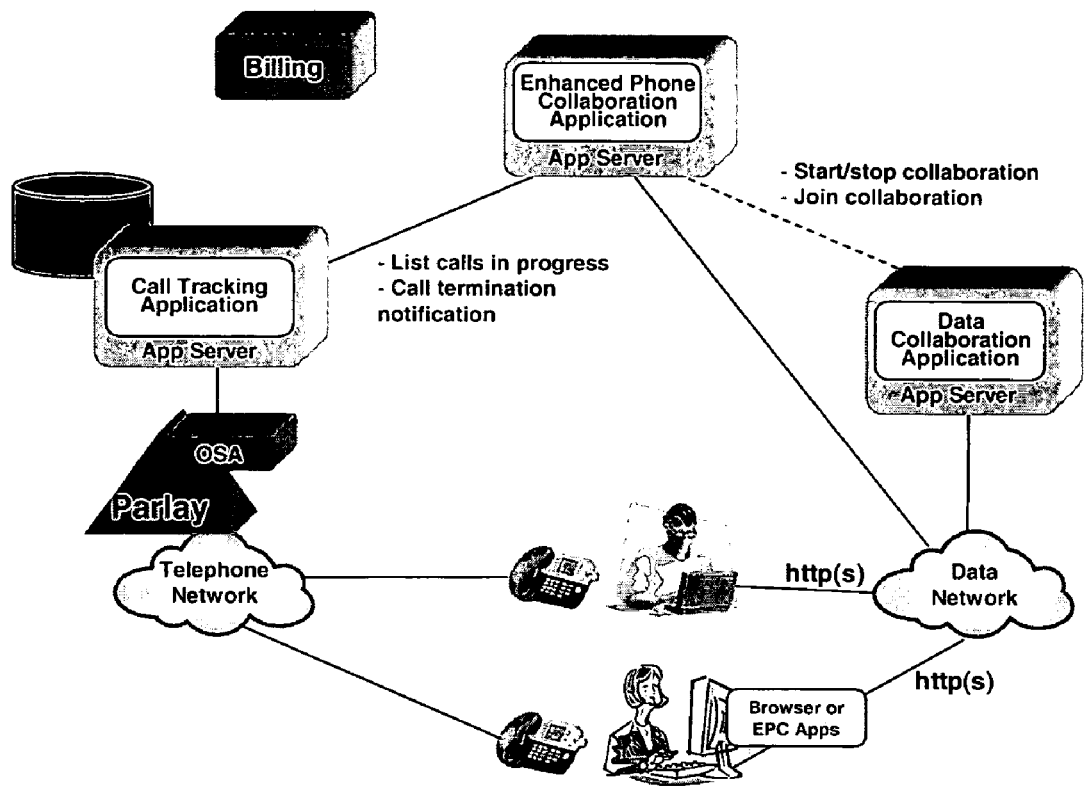
FIG. 2 depicts sample implementation architecture for EPC in accordance with an embodiment of the present invention utilizing wireline PSTN.

FIG. 2 depicts sample implementation architecture for EPC in accordance with an embodiment of the present invention utilizing wireline PSTN. The architecture shown in FIG. 2 contains the same components as those shown in FIG. 1, however, in FIG. 2, the Network Gateway comprises an OSA/Parlay call control interface, such as the ISCP/OSG product of Telcordia Technologies, Inc. This call control interface provides a server based Call Tracking Application with notifications necessary to track PSTN calls.

Figure 3:
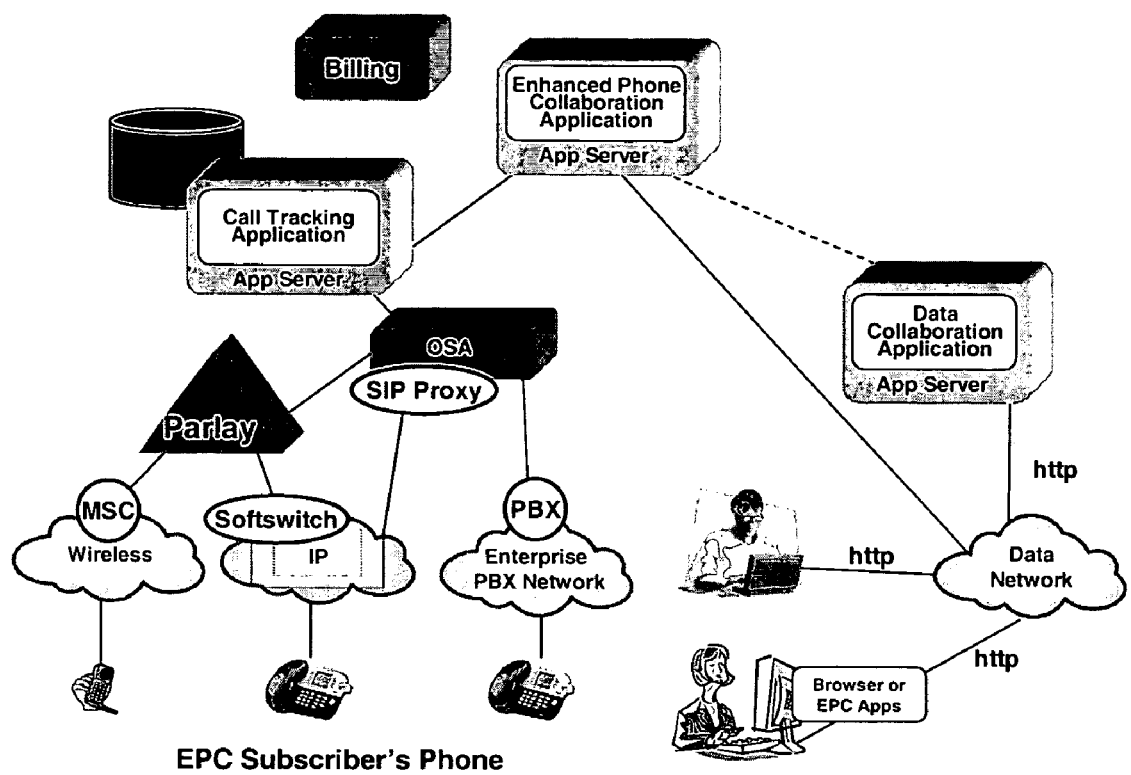
FIG. 3 depicts sample implementation architecture for EPC in accordance with an embodiment of the present invention utilizing wireless PSTN, PBX or IP phones.

FIG. 3 depicts sample implementation architecture for EPC in accordance with an embodiment of the present invention utilizing wireless PSTN, PBX or IP phones. In this architecture, the Call tracking Application is also server based and tracks calls via a standardized OSA/Parlay call control interface, such as that implemented by the ISCP/OSG product of Telcordia Technologies, Inc. The call control interface supports interfaces specific to particular telephone network implementations, such as MSC, soft switches or PBX phones.

General call processing flows representing service execution scenarios for the implementation architecture depicted in FIG. 2 are described below. In particular, scenarios where only one or both communicating users subscribe to the EPC service are described as well as scenarios based on whether real-time call information is available from the telephone network.

The EPC service may be made available using either a standard web browser or a service-specific client application that subscribers would need to install before using the EPC service. The scenarios below focus on the web browser case. However, the application case is similar, with the browser interface replaced by the client application-specific interface (such as web services, sockets etc.) over which similar data content flows.

Further, for the scenarios discussed, the Data Collaboration Application is browser based, i.e., it can be easily accessed by anyone with a web browser connected to the IP network. Standard HTTP Requests can be used to access the EPC service. The choice of HTTP Requests is an implementation decision for both the EPC application and Data Collaboration Application. While HTTP POST and HTTP GET represent typical uses, the present invention is not so limited and other alternative requests can be utilized. In this example, HTTP GET is used for loading of an EPC web page and HTTP POST is used for form-based actions following a user input.

Further, all HTTP messages could be secured if HTTPS is used instead of plain HTTP, at the cost of some performance degradation. Therefore, in the following description, all references to HTTP mean that HTTPS could be alternatively used in its place.

The EPC service may be implemented with a variety of interfaces between server side components and the discussion below assumes the following server side interfaces.

The Call Tracking Application exposes a web service consumed by the EPC application and allows for listing current subscriber's calls, and registering for and receiving call teardown notification.

The Data Collaboration Application exposes a web service consumed by the EPC application and allows creation and deletion of a data collaboration conference.

The present invention is not limited to web services for the server side component interfaces, but rather includes other distributed computing technologies, such as CORBA, DCOM, Java RMI etc.

Based on the assumptions noted above, the flows that follow describe only one possible implementation choice, i.e. that shown in FIG. 2. The technical detail provided is not essential to the EPC service but makes the description consistent.

The EPC service offers most of its advantages with full telephony integration, wherein creation and access to data conference is automated based on information already present in the telephone network. This information includes the telephone call; the associated parties that already agreed to participate in the call and the timing of the call.

Further, the EPC service is most valuable if both users subscribe to the service. However, the EPC service is still valuable if only one user subscribes. Since in the initial phase of the service deployment a single subscriber scenario is more likely to occur, descriptions for both single subscriber and two subscribers follow.

Figure 4:
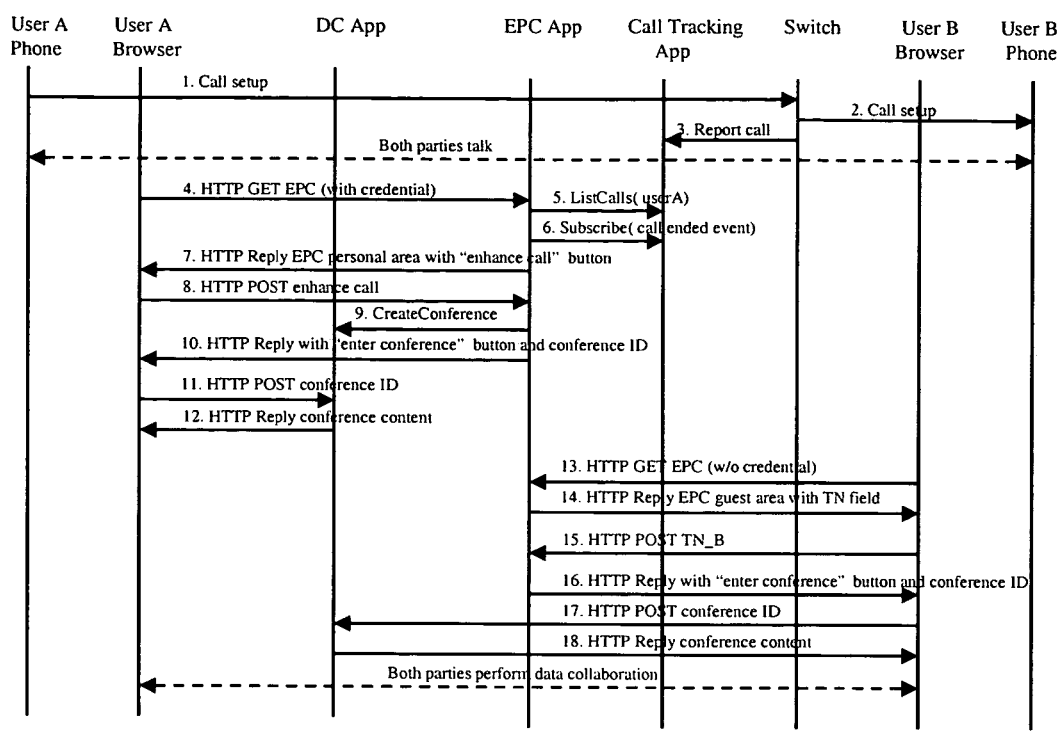
FIG. 4 shows a call flow for a scenario according to the present invention wherein a subscriber and non-subscriber are collaborating and have access to full telephony integration.

FIG. 4 shows a call flow for a scenario according to the present invention wherein a subscriber and non-subscriber are collaborating and have access to full telephony integration.

Step 1. User A (the subscriber) initiates a telephone call to user B (not a subscriber). This is a simplified and abstracted signaling that may take different forms in different telephony environments (PSTN, VoIP, PBX etc), however, full details are not essential to the EPC service.

Step 2. User B answers the call. It is irrelevant which user initiates the call, e.g., the call might have been initiated by user B and answered by user A.

Step 3. The switch reports the call to the Call Tracking Application (for example utilizing Parlay interface of the ISCP node). This is one possible variant based on registering a trigger for the subscriber telephone line. A trigger-less variant is also possible and described in more detail below.

Step 4. During the telephone call, both parties agree to enhance the call with data collaboration features using standard web browsers on their PCs. User A, the subscriber loads the EPC web page into the browser. The browser could optionally authenticate user A as a subscriber or automate the step by passing pre-stored subscriber credentials in a way standard for web based personalized services.

Step 5. Recognizing user A as a subscriber, the EPC Application invokes a ListCalls web service on the Call Tracking Application querying for calls currently in progress that involve user A. The web service call returns information about the call between user A and user B. This information includes user B telephone number TN_B. The EPC Application stores this information in preparation for establishing a data conference.

Step 6. This step is an optional step in which the EPC Application invokes a web service in order to register for call tear down notification from the Call Tracking Application (which in turn performs appropriate registration depending on the particular telephony environment, e.g., utilizing Parlay interface of the ISCP node). This step is optional and performed only if automated conference stopping is required by the service or users and implemented by the Data Collaboration Application.

Step 7. In response to the original web page request of user A, the EPC Application returns a personal EPC web page to user A that includes information about the current call and the "enhance call" button.

Step 8. User A clicks on the "enhance call" button, which generates an HTTP POST message to the EPC Application.

Step 9. In another optional step, the EPC Application creates a new instance of data collaboration conference. This is accomplished by invoking a web service exposed by the Data Collaboration Application. As a result of this step a conference ID is established either by the EPC Application or by the Data Collaboration Application. This conference ID could take many different forms depending on the particular Data Collaboration Application, e.g. it could be a pair of conference reference number and PIN number. This step is optional and may not be required if the Data Collaboration Application creates a new instance automatically when the first conference participant joins.

Step 10. The EPC Application returns a confirmation page to user A with the "enter conference" button together with associated information (using HTML form mechanism) consisting of the Data Collaboration Application network address, conference ID established in step 9 and user A's full name to be used as conference participant identifier. Only the "enter conference" button is rendered visibly to the user, the rest of the information is hidden.

Step 11. User A clicks the "enter conference" button which generates an HTTP POST message directly to the Data Collaboration Application with enough information to allow user A's participation in the instance of data collaboration conference.

Step 12. The Data Collaboration Application returns Data Collaboration specific content including active content that loads into user A's browser realizing start of his/her participation in a data conference.

Step 13. When user A's participation in data conference is completed, user A informs user B over the telephone call that user B may enter a conference via the main EPC web page. Preferably the main EPC URL is easy to memorize and enter into a browser, e.g. epc.com. User B loads the main EPC page using a standard browser.

Step 14. Since user B is not a subscriber, no credentials are passed and a public guest area is loaded into user B's browser. This web page offers a guest user a way to enhance a phone call with the service subscriber by obtaining guest user's telephone number (telephone number edit field and the "enhance call" button). Knowledge of one's own telephone number and the time window of the telephone call are the only prerequisites for a guest user to enter a data collaboration conference with a subscriber.

Step 15. User B enters his/her own telephone number TN_B and clicks "enhance" call button generating an HTTP POST message to the EPC Application with TN_B information.

Step 16. The EPC Application correlates TN_B with the call and conference it keeps track of. It returns the same confirmation web page with the "enter conference" button as it did to user A in step 10. In particular it includes conference ID identifying the data conference user A is already participating in waiting for user B to arrive.

Step 17. User B clicks the "enter conference" button generating HTTP POST message directly to the Data Collaboration Application that transmits the conference ID and user B's telephone number to be used as data conference participant identifier.

Step 18. The Data Collaboration Application returns Data Collaboration specific content including active content that loads into user B's browser realizing the start of participation in a data conference. Users A and B immediately "see" each other in that conference (user A's name and user B's telephone number are passed to the Data Collaboration Application as participant identifiers). With the conference established, while still talking on the phone, user A and user B can now engage in data collaboration as implemented by the Data Collaboration Application (e.g. white boarding, app sharing, gaming etc.)

In another embodiment of the present invention, steps 8–12 above could also be optimized and performed in a way requiring only a single button click from a user.

As indicated in the description of step 3 of the above flow, a variant flow is possible depending on details of telephony integration. In particular, instead of the Call Tracking Application requiring triggers for telephone line of each EPC subscriber, it is possible to implement a trigger less variant if the telephone network allows to query in real-time for call information.

Figure 5:
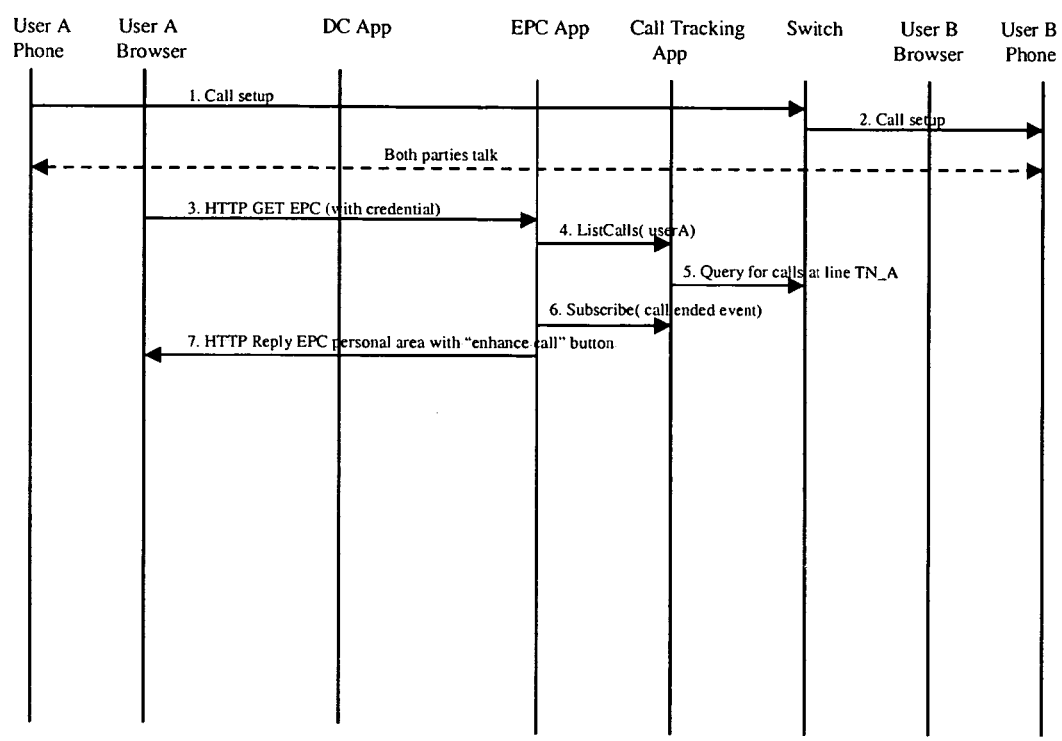
FIG. 5 shows a call flow for a scenario according to the present invention wherein a subscriber and non-subscriber are collaborating and have access to full telephony integration, but without intelligent network (IN) triggers.

FIG. 5 shows a call flow for a scenario according to the present invention wherein a subscriber and non-subscriber are collaborating and have access to full telephony integration, but without IN triggers. Only a few of the steps of the flow are shown, so as to focus on the differences from that shown in FIG. 4.

Steps 1–2. Phone call setup between users A and B. The switch does not report the call as no trigger is maintained.

Step 3. User A, the subscriber loads the main EPC web page.

Step 4. The EPC Application obtains call information for user A by invoking ListCalls web service of the Call Tracking Application.

Step 5. The Call Tracking Application obtains information asked by the EPC Application by itself querying the telephone network supplying the user A's line number TN_A. This could take many different forms depending on the particular telephone network and involve different telephone network elements, e.g. the ISCP node.

The rest of the steps remain the same as those described for FIG. 4.

In the event that both users are subscribers to the EPC service, the experience of both users is symmetrical and may be fully automated. Neither user needs to enter a telephone number as such information is already tracked by the EPC service. A number of implementations are possible where both users are subscribers. For example, the sequence in which the users join the data conference may be synchronized so that the calling user needs to establish a conference first before the called user can join. This could be appropriate if the calling user is billed for the data enhancement and no conference can be created without that user's initiative. However, it is also possible for both users to initiate call enhancement at the same time and the data conference could be created by whoever gets to that point faster. For simplicity, in the flow description of FIG. 6, user B joins the data conference after user A.

Figure 6:
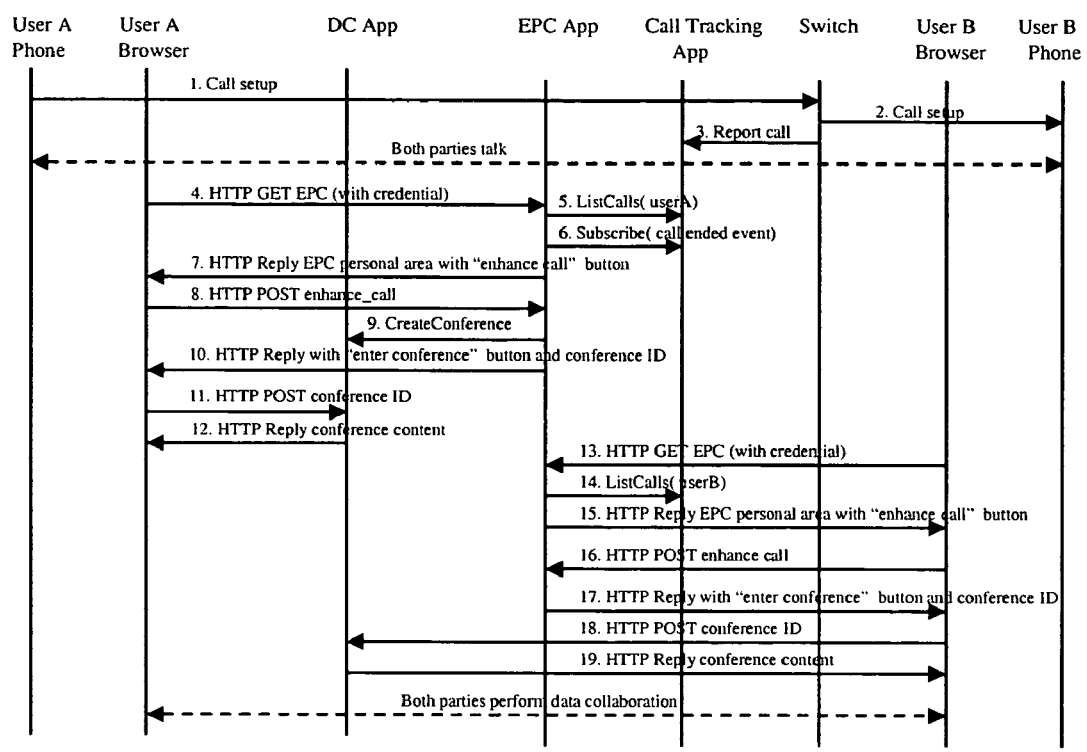
FIG. 6 shows a call flow for a scenario according to the present invention wherein two subscribers are collaborating and have access to full telephony integration.

FIG. 6 shows a call flow for a scenario according to the present invention wherein two subscribers are collaborating and have access to full telephony integration.

Steps 1–12. The telephone call is established and user A enhances the call. These steps are identical to the one subscriber case described in FIG. 4. The telephony integration variant without a trigger described in FIG. 5 applies here as well.

Step 13. User B loads the main EPC web page providing authentication credentials either entered explicitly or automatically supplied by the web browser.

Step 14. Recognizing User B as subscriber, the EPC Application invokes a ListCalls web service on the Call Tracking Application querying for calls currently in progress that involve user B. If the optional step of having the EPC Application register for call teardown event when processing user A has been carried out, this registration step is no longer necessary for user B.

Step 15. The EPC Application returns user B's personal web page including the description of the phone call with user A and the "enhance call" button. It may look identical to the web page user A received or it may additionally contain information that user A is already waiting for user B in a data collaboration conference.

Steps 16. User B clicks the "enhance call" button generating an HTTP POST message to the EPC Application.

Step 17. The EPC Application returns confirmation web page with the "enter conference" button and invisible information including the Data Collaboration Application network address, the conference ID corresponding to the already created data conference and user B's full name to serve as conference participant identifier.

Step 18. User B clicks the "enter conference" button generating HTTP POST to the Data Collaboration Application with conference ID and user B name in it.

Step 19. The Data Collaboration Application returns Data Collaboration-specific content including active content that loads into user B's browser realizing participation in a data conference.

After the data conference is created, the EPC service may optionally provide automated stopping of the data conference when the telephone call is hung up. This is an optional feature depending on the following considerations. The Data Collaboration Application may not expose the external interface for stopping a conference (i.e. it can only be stopped on explicit request from one of the conference participants or automatically when all participants leave). The users may actually prefer to continue data collaboration after the phone call is hung up (e.g. the phone call is used to "ignite" a network gaming session during which no further phone connection is desired by the users).

Figure 7:
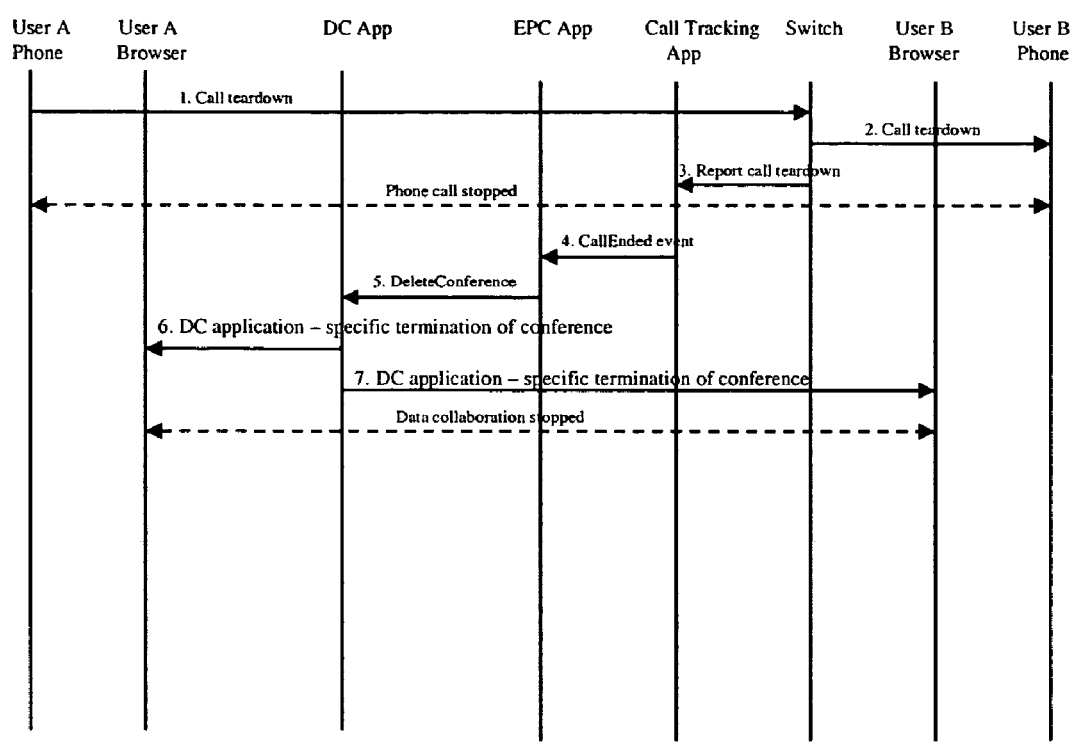
FIG. 7 shows a call flow for a scenario according to the present invention that provides for automated stopping of the data collaboration conference.

FIG. 7 shows a call flow for a scenario according to the present invention that provides for automated stopping of the data collaboration conference.

Step 1. User A hangs up the telephone call.

Step 2. The switch hangs up call.

Step 3. The switch reports call teardown event to the Call Tracking Application. In the case of IN PSTN network, this may involve a Parlay interface implemented by the ISCP node.

Step 4. The Call Tracking Application reports the event to the EPC Application by invoking its appropriate web service specified when subscribing for such notification during data conference setup.

Step 5. The EPC Application invokes a web service implemented by the Data Collaboration Application requesting stopping of the data conference associated with the telephone call.

Steps 6–7. The Data Collaboration Application performs its own specific actions for stopping the data conference on user A's and user B's PCs.

The above flows describe scenarios where there is full telephone integration. In the following flows, full telephony integration is not possible (e.g. the PBX does not have required CTI module installed necessary for interfacing with CTI apps such as the EPC service). This reduces the amount of automation that can be included in the EPC service, and requires that users enter the information identifying the call. However, the service is still beneficial to the users by offering simple and widespread addressing based on telephone numbers the users already know in order to create a common meeting space in the form of a data collaboration conference.

Other than the need to have the user enter a telephone number, the service operates in the same way as in the full telephony integration case. Therefore, it is possible to implement the service efficiently to target both types of environments, i.e. one and two subscribers. In addition, the "look and feel" and ergonomics of the service for the users is very similar making it easy to use the service when "switching" between full and limited telephony integration.

Figure 8:
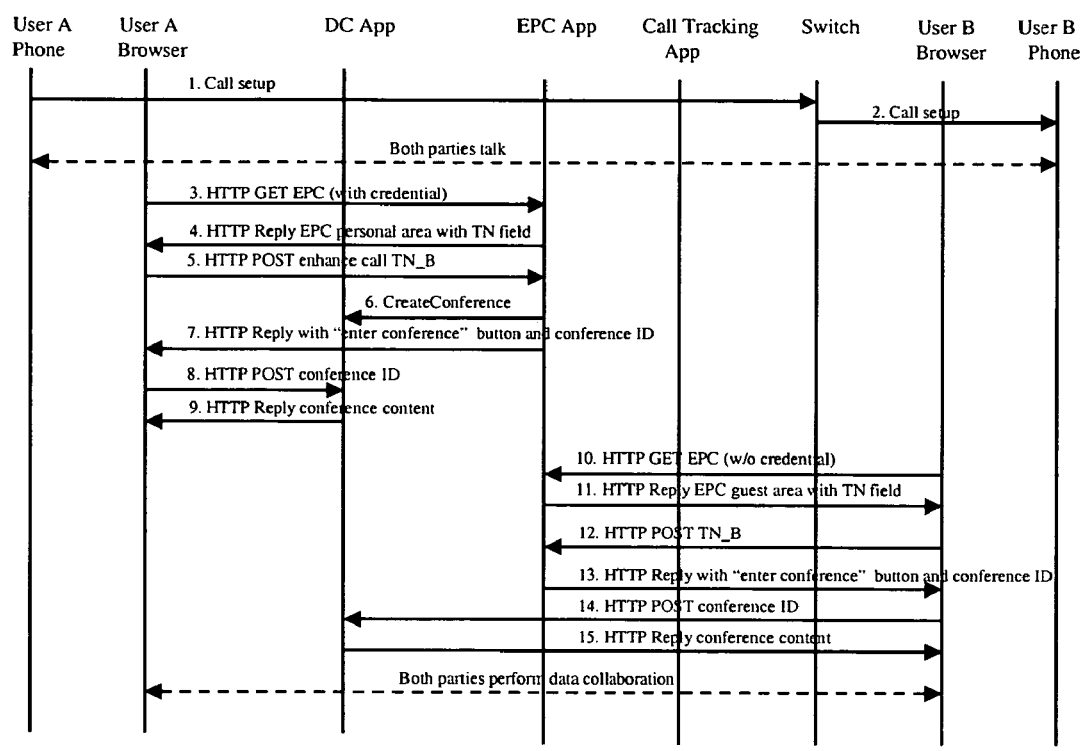
FIG. 8 shows a call flow for a scenario according to the present invention wherein a subscriber and non-subscriber are collaborating but do not have access to full telephony integration.

FIG. 8 shows a call flow for a scenario according to the present invention wherein a subscriber and non-subscriber are collaborating but do not have access to full telephony integration. The subscriber creates a data conference and identifies it by the non-subscribing user's telephone number. The non-subscribing user needs to enter that telephone number in order to join. The subscriber may be billed for the enhanced service and therefore is in control of creating as well as stopping the data conference. Otherwise the service executes in the same way as in the full telephony integration case. It is noted that the non-subscriber's experience and corresponding part of the flow is exactly the same as in the case of full telephony integration with only one subscriber.

Steps 1–2. A phone call is established between user A, the subscriber, and user B, not a subscriber.

Step 3. During the telephone call, both parties agree to enhance the call with data collaboration. User A, the EPC subscriber, loads the EPC web page into a browser following either explicit or automated (remembered by the browser) authentication.

Step 4. Recognizing user A as a subscriber, the EPC Application returns a personalized web page containing a call enhancement area. In this area user A may enter a telephone number of other parties that user A is on a call with.

Step 5. User A enters user B's telephone number, TN_B, and clicks the "enhance call" button. This generates an HTTP POST message to the EPC Application transmitting the TN_B.

Step 6. As an optional step, the EPC Application creates a new instance of data collaboration conference by invoking an appropriate web service exposed by the Data Collaboration Application. As a result, a conference ID is established. This step may not be required if the Data Collaboration Application creates a new instance automatically when the first conference participant joins.

Step 7. The EPC Application returns a confirmation page to user A with the "enter conference" button together with associated information consisting of the Data Collaboration Application network address, the conference ID established in step 6 and user A's full name to be used as a conference participant identifier. Only the "enter conference" button is rendered visibly to the user, the rest of the information is hidden.

Step 8. User A clicks the "enter conference" button which generates an HTTP POST message directly to the Data Collaboration Application with enough information to allow user A's participation in the data collaboration conference.

Step 9. The Data Collaboration Application returns Data Collaboration-specific content including active content that loads into user A's browser realizing participation in a data conference.

Steps 10–15. When user A's participation in data conference is completed, user A informs user B over the telephone call that user B may enter the conference via the main EPC web page. The steps are identical to the corresponding steps 13–18 in the case of full telephony integration with only one subscriber, as described in FIG. 4.

In a further embodiment according to the present invention, steps 8–12 of the above flow can be optimized and performed in a single HTTP Reply cycle.

Figure 9:
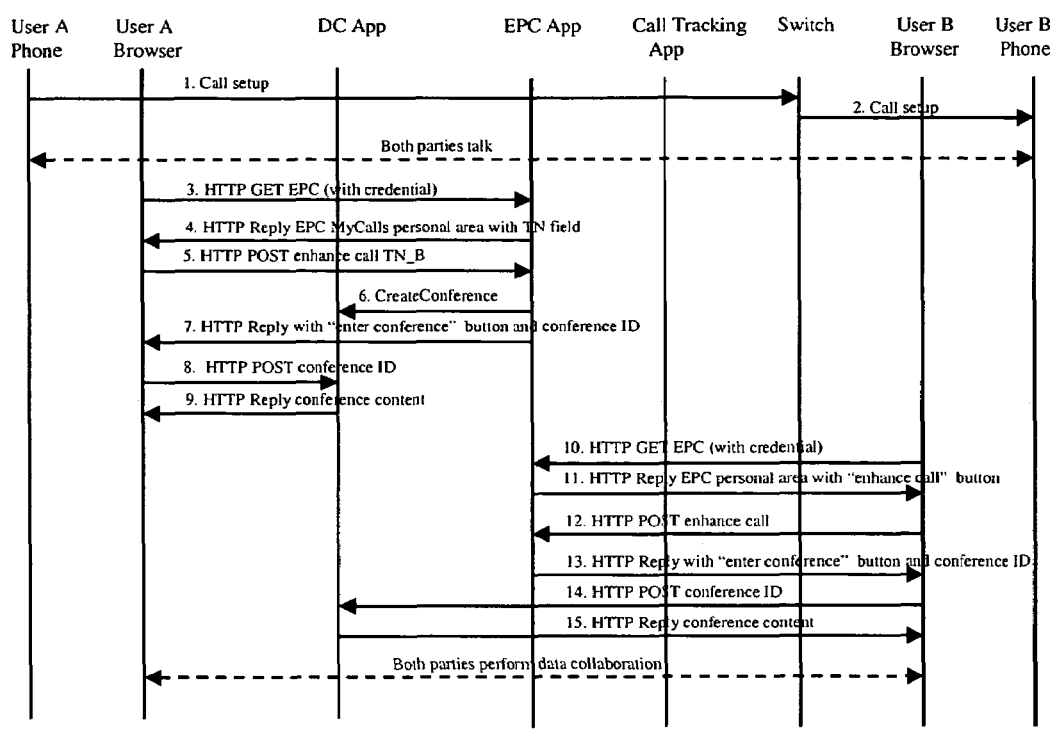
FIG. 9 shows a call flow for a scenario according to the present invention wherein two subscribers are collaborating but do not have access to full telephony integration.

FIG. 9 shows a call flow for a scenario according to the present invention wherein two subscribers are collaborating but do not have access to full telephony integration. The experience of the subscriber who first initiates call enhancement (and may be billed for it) stays the same as in the previous case described in FIG. 8. The experience of the other subscriber who follows second in enhancing the call side could be further automated by the fact that the EPC service knows that user and may remember the subscribers telephone number. In this case the user will be offered the "enhance call" button immediately after entering a personal EPC web page.

Steps 1–9. After the phone call is established, user A enhances the call. These steps are identical to the corresponding steps in the flow described in FIG. 8.

Step 10. User B loads the main EPC web page providing authentication credentials either entered explicitly or automatically supplied by the browser.

Step 11. The EPC Application remembers user B's telephone number TN_B, so it does not need to ask for it again. Therefore the reply contains user B's personal web page with the call information and the "enhance call" button. The page could also offer a way to enter and optionally remember an alternative telephone number that may currently be used by user B.

Steps 12–15. User B clicks the "enhance call" button and is taken into a data collaboration conference. These steps are identical to the corresponding steps 16–19 in the full telephony integration flow described in FIG. 6.

Security is an important consideration for any phone or data sharing system. One security concern is the prevention of unauthorized person from snooping the data traffic including media and signaling associated with the data collaboration conference between the valid users. As noted above, the EPC service may rely on HTTPS for securing its own signalling and on similar features implemented by the data collaboration service.

Another security concern is providing assurance to a valid service subscriber that the other data conference participant does not impersonate a valid user participating in the phone call. The EPC service according to the present invention provides such assurance. In particular, the case of full telephony integration and both users subscribing to the service, user A is assured by the EPC service that the person who could participate in the data conference enhancement must be authenticated as the subscriber to the EPC service corresponding to the telephone number user A is on the call with. This provides tight coupling between the person having access to the telephone line and the EPC service account. The EPC service provides information to both users on the subscription status of the other party (subscriber or not).

Additionally, if user A knows user B already and can recognize user B's voice, the user A knows that the person on the other line is user B and also knows that the person joining the data conference can prove to the EPC service that he is indeed user B.

In case of full telephony integration with only one susbciber, user B (non-subscriber) could similarly be assured that the data conference participant is indeed user A. This is because the EPC service tells user B that the other party is a subscriber and has been authenticated as user A. The subcribing user, user A, knows that the person joining the data conference satisfies the following two conditions: knows the telephone number TN_B of user B and additionally knows exactly the time window when the call is in progress. Furthermore, if an impersonator tries to join the conference after the valid user B joins, both users quickly see that this happens by being informed by the EPC service of a third participant. User A and user B can then quickly terminate the conference. This could still be a disadvantage in that the impersonator may have a short access to sensitive data material. In a separate embodiment according to the present invention, the Data Collaboration Application can be configured to admit a set number of participants in the conference (e.g. for the example above, 2 participants). The conference size limitation leaves an impersonator with a very small time window to join a data conference; i.e. after user A but before user B. If this restriction is still not satisfactory, an optional and additional pass code could be assigned to the conference by one of the users and then exchanged with the other user in the telephone conversation. The other user would be required to enter the pass code in addition to the telephone number prior to joining the data conference.

When only limited telephony integration is available, the same security features as described above based on the knowledge of the telephone number, time window, and optional pass code are applicable.

In addition, the automated conference stopping following teardown of the telephone call feature provides an extra security feature by assuring that the data conference is definitely over once the call ends without requirying any other action.

The security features can be provided as an option in the EPC service. In the event that the users do not want to take the extra steps of providing security, (e.g. setting up and exchanging of a pass code in a non-subsriber case), then the EPC service can offer a simpler, quicker, "single click" usage.

Since the majority of telephone calls are two-party calls, we focused our description so far on that case as noted above. However, the EPC service can easily support multi-party telephone calls.

In the case of full telephony integration, the telephone network can provide information about multiparty calls, i.e, call established, party added/removed, call ended (similarly to two-party call information described above). Further, the Data Collaboration Application must be able to accommodate multiparty conferences.

The EPC service provides an easy means to create data collaboration with a high degree of spontaneity. For example, a two party collaboration that evolves into a 3-way collaboration can be easily handled by the EPC service according to the present invention, by addition of the third party in the middle of the call.

In the event that the third or N-th call leg of the multiparty call is the only subscriber, the EPC service of the present invention is still useful. In particular, upon the N-th call leg (subscriber) being established, the subscriber may use the EPC service in a way similar to that described above. The EPC Application will show the subscriber the multiparty call information (including information about all parties) and an "enhance call" button next to it. Further, if the N-th caller is not a subscriber, then such caller, may enter a collaboration session, in the same fashion as described above for a non-subscriber.

In the case of limited telephony integration, the two-party call scenarios are easily extended to multi-party by requiring the subscriber to enter the telephone number(s) of non-subscriber(s). The EPC Application supplies the same data conference ID to the browsers/apps of all users participating in a multi-party telephone call and thus ensures that they all land in the same instance of the data conference. Participant information is provided by the EPC service as well in the form of names and telephone numbers and represented accordingly in the multi-party data conference.

It is anticipated that other embodiments and variations of the present invention will be readily apparent to the skilled artisan in the light of the foregoing description and examples, and it is intended that such embodiments and variations likewise be included within the scope of the invention as set out in the appended claims.

What is claimed is:

1. A method for transitioning from an existing telephone call to a real-time collaboration session in a system including a telephone network for establishing connections between users and a data network for establishing data sharing sessions between said users, each of said users having an associated user access and presentation device, said data network including an enhanced phone based collaboration (EPC) application, and at least one of said users subscribing to said enhanced phone based application, said method including the step of:

said one user on an existing telephone call user invoking the operation of said EPC application solely by clicking on a control button on said user's associated device to cause said enhanced phone based collaboration to add the collaboration session to the existing telephone call between said users without the users exchanging collaboration session idnetifiers.

2. The method of claim 1 for transitioning from an existing telephone call to a real time collaboration session wherein said user access and presentation device is a PC, a notepad, or a PDA.

3. The method of claim 1 for transitioning from an existing telephone call to a real time collaboration session wherein said one of said users subscribes to said enhanced phone based collaboration application but at least another of said users is a guest non-subscribing user, said method further comprising the steps of:

said one subscribing user providing a guest page Uniform Resource Location (URL) for the guest non-subscribing user;

said guest user using the URL to open a web page to gain access to the enhanced based collaboration application; and said guest user entering the real-time collaboration session by entering its own telephone number and clicking on an "enter conference" button on said guest user's associated device.

4. The method of claim 3 for transitioning from an existing telephone call to a real time collaboration session wherein said web page is in a browser.

5. The method of claim 3 for transitioning from an existing telephone call to a real time collaboration session wherein said session includes a plurality of guest non-subscribing users, each of said plurality of guest non-subscribing users gaining access to the enhanced phone based collaboration application and entering the session by its own telephone number and clicking on an "enter conference button" on its associated device.

6. A method for transition an existing telephone call to a real-time collaboration session in a system including a telephone network for establishing telephone connections between users and a data network for establishing data sharing sessions between each of said users, each of said users having an associated user access and presentation device, said data network including an enhanced phone based collaboration (EPC) application, and at least one of said users subscribing to said enhanced phone based collaboration application, and said one user having a plurality of telephone calls in progress, said method comprising the steps of:

tracking the in progress telephone calls of said one user; and choosing a particular one of said telephone calls in progress to be transitioned to the real-time collaboration session, and said one user clicking on a control button on said user's associated device to cause said enhanced based phone collaboration application to add the collaboration session to the chosen existing telephone call.

7. The method of claim 6 for transitioning from an existing telephone call to a real-time collaboration session wherein said tracking step comprises displaying to said one user a list of the in progress telephone calls over a web interface and said step of choosing comprises said one user clicking on an established telephone call on said list.

8. The method of claim 1 for transitioning from an existing telephone call to a real-time collaboration session wherein at least two of the users to be transitioned to the real-time collaboration session subscribe to the enhanced based phone collaboration application, said method further comprises comprising the step of each of said two subscribing users selecting the telephone call to be enhanced; and each of said two subscribing users adding the collaboration session to the existing telephone call simply by clicking on an "enhanced call" button on its associated device.

9. The method of claim 1 for transitioning from an existing telephone call to a real-time collaboration session wherein one of said users subscribes to said enhanced phone based collaboration application but a second of said subscribers is a guest non-subscribing user, said enhanced based phone collaboration application including a choice driven web page, said method further comprising the steps of said one user loading an EPC web page into a browser;

after said one user has clicked on said one user's "enter conference" button, said one user advising said guest user that the guest user may enter the collaboration session via the EPC web page; and said guest user entering the collaboration session using its own telephone number and an "enter conference button" on its associated device.

* * * * *